US012045210B1

(12) United States Patent
Horwitz et al.

(10) Patent No.: US 12,045,210 B1
(45) Date of Patent: Jul. 23, 2024

(54) MECHANISM FOR ZERO DOWNTIME MIGRATION OF STRONGLY CONSISTENT DISTRIBUTED DATABASE CLUSTERS

(71) Applicant: Oracle International Corporation, Redwood Shores, CA (US)

(72) Inventors: Joshua Aaron Horwitz, Centreville, VA (US); Andrew Pryde, Bristol (GB); Prabhakar Palanivel, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/320,677

(22) Filed: May 19, 2023

(51) Int. Cl.
G06F 16/00 (2019.01)
G06F 16/21 (2019.01)
G06F 16/23 (2019.01)
G06F 16/27 (2019.01)

(52) U.S. Cl.
CPC .......... G06F 16/214 (2019.01); G06F 16/235 (2019.01); G06F 16/27 (2019.01)

(58) Field of Classification Search
CPC ....... G06F 16/214; G06F 16/235; G06F 16/27
See application file for complete search history.

(56) References Cited

U.S. PATENT DOCUMENTS

| 8,606,938 | B1 * | 12/2013 | Chong | H04L 61/4511 |
| | | | | 709/228 |
| 11,294,870 | B1 * | 4/2022 | Waas | G06F 16/215 |
| 2008/0114897 | A1 * | 5/2008 | Awadallah | H04L 61/4511 |
| | | | | 709/245 |
| 2019/0235898 | A1 * | 8/2019 | Koehler | G06F 9/45558 |

FOREIGN PATENT DOCUMENTS

WO  WO-2021045824 A1 *  3/2021  .......... G06F 11/3034

* cited by examiner

*Primary Examiner* — Diedra McQuitery
(74) *Attorney, Agent, or Firm* — Kilpatrick Townsend & Stockton LLP

(57) ABSTRACT

A distributed database service can be migrated from a source environment to a destination environment. The distributed database service can be associated with a database and database members. the source environment can include source database members such that each source database member includes a respective image of the database. Migrating the distributed database service can include provisioning a migration gateway in the source environment. Migrating the distributed database service can also include provisioning a domain name system service in the destination environment. Migrating the distributed database service can also include provisioning a first destination database member in the destination environment. While updating the first destination database member with a respective image of the database, the distributed database service can process a database request.

20 Claims, 8 Drawing Sheets

MECHANISM FOR ZERO DOWNTIME MIGRATION OF STRONGLY CONSISTENT DISTRIBUTED DATABASE CLUSTERS

BACKGROUND

Distributed database clusters can be strongly consistent. Strongly consistent distributed database clusters may use consensus mechanisms to ensure that the database members of the distributed database cluster handle database requests consistently. In some situations, distributed database clusters may need to be migrated from a source environment to a destination environment.

BRIEF SUMMARY

In some embodiments, a method may include receiving, by a distributed database service, a request to migrate the distributed database service from a source environment to a destination environment, wherein the distributed database service is associated with a database and database members, the source environment including source database members, wherein each source database member includes a respective image of the database; provisioning, by the distributed database service, a migration gateway in the source environment; provisioning, by the distributed database service, a domain name system (DNS) service in the destination environment; provisioning, by the distributed database service, a first destination database member in the destination environment; and while updating the first destination database member with a respective image of the database, processing, by the distributed database service, a database request, wherein updating the first destination database member includes: sending a database image request to the DNS service, wherein the database image request includes a hostname of a first source database member; sending the database image request to the migration gateway based at least in part on the hostname of the first source database member; and receiving a respective image of the database.

In some embodiments, a system may include a distributed database service associated with a database and database members; a source environment including source database members, wherein each source database member includes a respective image of the database; a destination environment; wherein the distributed database service is configured to: receive a request to migrate the distributed database service from a source environment to a destination environment, wherein the distributed database service is associated with a database and database members, the source environment including source database members, wherein each source database member includes a respective image of the database; provision a migration gateway in the source environment; provision a domain name system (DNS) service in the destination environment; provision a first destination database member in the destination environment; and while updating the first destination database member with a respective image of the database, process a database request, wherein updating the first destination database member includes: send a database image request to the DNS service, wherein the database image request includes a hostname of a first source database member; send the database image request to the migration gateway based at least in part on the hostname of the first source database member; and receive a respective image of the database.

In some embodiments, one or more non-transitory computer-readable medium comprising computer-executable instructions that, when executed by one or more processors, cause the one or more processors to perform operations including receiving a request to migrate the distributed database service from a source environment to a destination environment, wherein the distributed database service is associated with a database and database members, the source environment including source database members, wherein each source database member includes a respective image of the database; provisioning a migration gateway in the source environment; provisioning a domain name system (DNS) service in the destination environment; provisioning a first destination database member in the destination environment; and while updating the first destination database member with a respective image of the database, processing a database request, wherein updating the first destination database member includes: sending a database image request to the DNS service, wherein the database image request includes a hostname of a first source database member; sending the database image request to the migration gateway based at least in part on the hostname of the first source database member; and receiving a respective image of the database.

In some embodiments, a method for container orchestrate framework aware port scanning may include identifying, by a scanner service, a first node of one or more nodes associated with a container management service, the container management service configured to manage a set of services by allocating managed containers associated with the set of services to the one or more nodes, and the scanner service configured to identify vulnerabilities of processes running on the one or more nodes; determining, by the scanner service, a first container identifier associated with a first managed container; scanning, by the scanner service, the first managed container for vulnerabilities; determining, by the scanner service, a second container identifier associated with a second managed container; determining, by the scanner service, whether the first container identifier corresponds to the second container identifier; in accordance with determining that the first container identifier does not correspond to the second container identifier, scanning, by the scanner service, the second managed container for vulnerabilities; and in accordance with determining that the first container identifier corresponds to the second container identifier, determining, by the scanner service, to forgo scanning the second managed container.

In any embodiments, any and all of the following features may be implemented in any combination and without limitation. Migrating the distributed database service from the source environment to the destination environment can have zero downtime for the distributed database service. The distributed database service can require consensus across a majority of database members. The method/operations can also include provisioning, by the distributed database service, additional source database members in the source environment for the distributed database service. The method/operations can also include updating the additional source database members with respective images of the database. The source environment can include at least three source database members. The additional source database members can include at least two additional source database members. The method/operations can also include removing a source database member. The method/operations can also include provisioning, by the distributed database service, a second destination database member in the destination environment. The method/operations can also include updating the second destination database member with a respective image of the database. The method/operations can also include processing, after updating the first destination database member, a second database request, wherein the first destination database member processes the second database request. The database members can communicate via database member hostnames.

DETAILED DESCRIPTION

Figure 1:
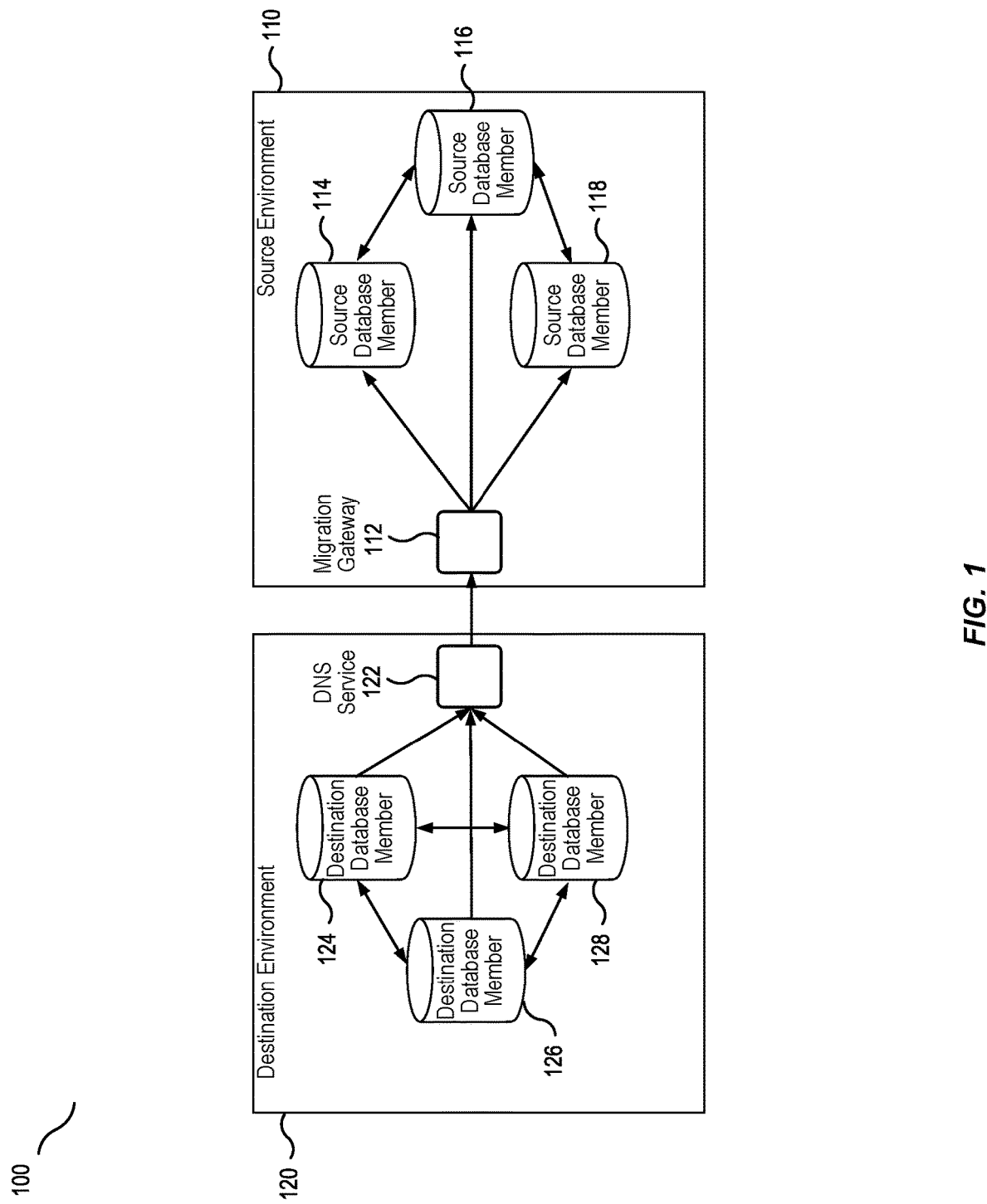
FIG. 1 is a diagram illustrating example systems involved in a zero-downtime migration, according to at least one embodiment of the present disclosure.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media that provide techniques for migrating a distributed database cluster from a source environment to a destination environment. A distributed database cluster can be associated with a distributed database service that has a database. The distributed database service handles database requests from users and/or clients. The distributed database service and distributed database cluster can be distributed such that multiple database service members (also referred to as database members) each have an image of the database and can process database requests from clients. Database service members can be a physical device or a portion of a physical device such as servers and/or other types of computing devices. Database service members can also be implemented in software such as virtual machines, containers, or containerized processes. Typically, an environment is defined such that the elements and/or parts of the environment (for example, the database service members) are able to communicate directly or through in-network means.

In some examples, the distributed database service and/or distributed database cluster can be strongly consistent. In order to be strongly consistent, the images (associated with the database of the distributed database service) can be consistent across the database service members and highly available to clients to process database requests. In strongly consistent distributed database clusters, sometimes read and write operations may need to be duplicated or verified by more a majority of database service members. Strongly consistent distributed database clusters can use consensus mechanisms to ensure consistency of database images across the database service members. Consistency of database images across the database service members are configured to ensure that database requests are handled consistently regardless of which database service member handles a database request. An example consensus mechanism can include Raft, for example, the Raft consensus algorithm.

In some examples, software applications can be rearchitected and/or redeployed. For example, a distributed database service and/or distributed database cluster may be desired to be rearchitected and/or redeployed. Such a rearchitecture and or redeployment can be considered a migration. An example of a migration can include migrating a software application from on-premise servers and computing devices to a cloud environment. This example of a migration can be considered a redeployment. Similarly, a migration can include moving a software application from a first type of architecture to a second type of architecture, such that components of the software application are rearranged. This example of a migration can be considered a rearchitecture. In some examples, a migration can involve both a rearchitecture and a redeployment.

Migrating a distributed database cluster from a source environment to a destination environment can be designed to be fully automated and have zero-downtime such that a customer and/or user of the distributed database service can be unaware that a migration is occurring. Furthermore, the migration can be configured to have no single point of failure.

When migrating a distributed database cluster from a source environment to a destination environment, the source environment and destination environment can be different networks, architectures, or deployments such that database members in the source environment may not directly communicate with database members in the destination environment. Similarly, database members in the destination environment may not be able to directly communicate with database members in the source environment. In some examples, the database members can be database instances that are in containers or containerized deployments. For example, the distributed database cluster could be a Kubernetes cluster. In some examples, the database instances may not be able to communicate across the source environment and the destination environment directly. For example, the database members of the source environment may not be directly addressable from the destination environment.

The techniques described herein relate to zero-downtime migration of a distributed database service and/or distributed database cluster such that database requests from clients can still be processed by the distributed database service while the migration is occurring. In order to facilitate a zero-downtime migration of the distributed database service and/or the distributed database cluster, the zero-downtime migration can comply with conditions of the distributed database service. For example, if the distributed database service is strongly consistent and uses a consensus mechanism, the zero-downtime migration can comply with conditions to ensure that the distributed database service stays strongly consistent and operates within the parameters of the consensus mechanism.

In some examples, a zero-downtime migration of a distributed database service from a source environment to a destination environment can include provisioning a domain name system (DNS) service in the destination environment. Provisioning the DNS service includes setting up the DNS service such that it can process DNS requests. The DNS service can receive requests from database members in the destination environment (also referred to as destination database members) to communicate with (for example, connect, send, or receive information from) a database member in the source environment (also referred to as source database members). In some examples, the destination database members and source database members cannot directly communicate. The DNS service can resolve requests to communicate with source database members to the IP address of a migration gateway, such that the DNS service can forward the requests to the migration gateway. The migration gateway, which is provisioned in the source environment, can communicate with the source database members and convey the requests from the DNS service to the source database members. In this way, the DNS service and the migration gateway promote communication between destination database members and source database members that could not normally communicate with each other.

In some examples, a zero-downtime migration of a distributed database service from a source environment to a destination environment can include provisioning new source database members. Provisioning new database members includes setting up the new database members such that they can process database requests. For example, the distributed database service can be a strongly consistent distributed database that relies on a consensus mechanism to maintain consistency across the database members. The consensus mechanism may require that a majority of database members be healthy in order for the distributed database service to handle database requests. A database member can be considered healthy via a variety of parameters including consistency with a source of truth, various connection parameters, various security parameters, and the like. In an example, a distributed database service that is being migrated from a source environment to a destination environment can be associated with three database members. A consensus mechanism could require such a distributed database service to have a majority of database members be healthy. A majority of three database members would be two database members. However, in order to maintain a zero-downtime migration, new database members are added to the destination environment as the database members in the source environment are still functioning. In the example above, adding one new destination database member would bring the total number of database members to four which would require a majority of three database members for the distributed database service to comply with its consensus mechanism. This is especially important because the newly added destination database member would be considered unhealthy until the destination database member can update its associated image of the database. As such, all three source database members should be healthy in order to maintain the distributed database service. As such, a zero-downtime migration of a distributed database service can include provisioning new source database members in order to maintain stability and consensus during the zero-downtime migration. In some examples, a zero-downtime migration of a distributed database service can include provisioning one or two new source database members.

In some examples, a zero-downtime migration of a distributed database service from a source environment to a destination environment can include provisioning one destination database member at a time, waiting for each destination database member to become healthy before provisioning a new destination database member. For example, if the zero-downtime migration had three database members originally prior to the migration, the destination environment will provision three destination database members one at a time such that a new destination database member is not provisioned until a former destination database member is healthy.

In some examples, a zero-downtime migration of a distributed database service from a source environment to a destination environment can include decommissioning (or deprovisioning) a source database member after a destination database member becomes healthy. For example, when a destination database member becomes healthy, a source database member can be deprovisioned. This can help ensure that the consensus mechanism and strongly consistent nature of the distributed database service stay simple and have relatively consistent conditions throughout the zero-downtime migration. In some examples, where the zero-downtime migration included provisioning new source database members, the new source database members are deprovisioned once all destination database members are provisioned. For example, a distributed database service could have three database members which are being migrated from the source environment to the destination environment. The zero-downtime migration can include provisioning two new source database members. The zero-downtime migration can then include provisioning three destination database members one at a time and deprovisioning a source database member after each destination database member becomes healthy. After the three destination database members become healthy, the last two source database members can be deprovisioned.

Turning now to the figures, FIG. 1 illustrates an example diagram 100 with example systems and components for implementing the zero-downtime migration techniques described herein. The example diagram 100 illustrates an example zero-downtime migration such that database members are being migrated from the source environment 110 to the destination environment 120. The source environment 110 can be a first network and the destination environment 120 can be a second network such that they are disconnected networks. In some examples, the source environment 110 and the destination environment 120 can be virtual networks, cloud networks, or virtual cloud networks. In this example, the original distributed database service includes three database members, which are the three source database members 114, 116, 118 in the source environment 110. After the zero-downtime migration is complete, the distributed database service will still have three database members but the three database members will be the three destination database members 124, 126, 128 in the destination environment 120.

In some examples, database cluster membership can dynamically change in one or both of the source environment 110 and the destination environment 120. In some deployments the database members can be database instances that are run as containers that can be dynamically started and ended as needed by the database service. For example, the database instances could be containers in Kubernetes clusters.

When preparing a zero-downtime migration, a DNS service 122 can be provisioned in the destination environment 120. The DNS service 122 can serve as a bridge from the destination database members 124, 126, 128 to the source environment 110 and the source database members 114, 116, 118. In some examples, the destination database members 124, 126, 128 cannot directly communicate with the source database members 114, 116, 118. Similarly, in some examples, the source database members 114, 116, 118 cannot directly communicate (communications include at least requesting, sending, or accessing information) with the destination database members 124, 126, 128. In some examples, database members can enable a mode to communicate with other database members through the use of host names and routing based on host names. Communicating via host names can use a DNS service to serve as an intermediary between the database members. In some examples, the destination database members 124, 126, 128 send all communications meant for other database members to the DNS service 122, where the DNS service routes the communication to the proper database member. In some examples, the destination database members 124, 126, 128 send all communications meant for source database members to the DNS service 122. The DNS service 122 can determine, based on the destination host name, that a communication is meant for a source database member. For example, the DNS service 122 can determine that the destination host name for a communication includes a top-level-domain for the source environment and thus the communication is meant for a source database member. In one example, the host name for a communication can include a suffix that indicates that the destination for the communication is in the source environment. When the DNS service 122 determines that a communication is meant for a source database member, the DNS service 122 can forward the communication to a migration gateway 112. The DNS service 122 may forward the communication through the use of an internet protocol (IP) address of the migration gateway 112.

When preparing a zero-downtime migration, a migration gateway 112 can be provisioned in the source environment 110. The migration gateway 112 can serve as a bridge from the source database members 114, 116, 118 to the source environment 110 and the destination database members 124, 126, 128. In some examples, database members can enable a mode to communicate with other database members through the use of host names and routing based on host names. Similarly, the migration gateway 112 can also enable a mode to communicate with database members through the use of host names and routing based on host names. The migration gateway 112 can receive a communication from the DNS service 122 and determine that the destination is a source database member based on the destination host name. The migration gateway 112 can then send the communication to the appropriate source database member. Similarly, the migration gateway 112 can receive communications from source database members that are intended to be sent to a destination database member. The migration gateway 112 can determine that a communication is intended to be sent to a destination database member based on the destination host name of the communication. When the migration gateway 112 determines that a communication is meant for a destination database member, the migration gateway 112 can forward the communication to a DNS service 122 or some other destination gateway. The migration gateway 112 may forward the communication through the use of an internet protocol (IP) address of the DNS service 122 or other destination gateway. The DNS service 122 or other destination gateway can then forward the communication to the appropriate destination database member.

The migration gateway 112 can also include load-balancers. Load-balancers can be used to balance network traffic through the migration gateway 112 such that communications between the destination database members and the source database members can be handled by the network infrastructure.

The zero-downtime migration also includes scaling up the number of source database members. The zero-downtime migration can include provisioning one or more additional source database members. After provisioning the one or more additional source database members, the additional source database members can communicate with the other source database members in order to receive respective images of the database. As described herein, the distributed database service can be strongly consistent and use a consensus mechanism in order to ensure consistency in the respective images of the database members and that the database members handle database requests consistently. Some consensus mechanisms have conditions to process database requests which can include that at least a majority of database members are healthy. A majority of database members can be referred to as a quorum. Increasing the number of source database members leads to better stability of the distributed database service and increases fault tolerance during the migration. If a majority of database members are not healthy, the distributed database service can go down and be unable to respond to database requests until the distributed database service is reestablished.

For example, a distributed database service that is being migrated from a source environment to a destination environment can be associated with three database members. The zero-downtime migration of a distributed database service can include provisioning one new source database member. The new source database member can communicate with the other source database members in order to become healthy and contain an image of the database. With four source database members, adding a destination database member brings the database membership to five. With five database members, the distributed database service can tolerate two unhealthy database members. The destination database member can be considered unhealthy until it becomes healthy and contains an image of the database after communicating with one or more the source database members which have an image of the database. Thus, in this example, the distributed database service can have an additional source database member go down or become unhealthy, yet still maintain a quorum to process database requests. In some examples, the zero-downtime migration can include provisioning two source database members.

Once a newly provisioned destination database member becomes healthy, a source database member can be deprovisioned. This allows the entire migration from the source environment to the destination environment to be consistent as one database member is migrated from the source environment to the destination environment at a time. In some examples, the provisioning of multiple source database members and destination database members can be done in parallel.

Once the migration of source database members to destination database members is complete, the client-side DNS mappings can be updated to point to destination database members. In this way, the database requests from a client can be processed by destination database members. In some examples, some client-side DNS mappings can be updated to point to destination database members during the migration after a destination database member becomes healthy.

Once the migration is complete, the resources of the source environment can be cleaned up and deprovisioned.

Figure 2:
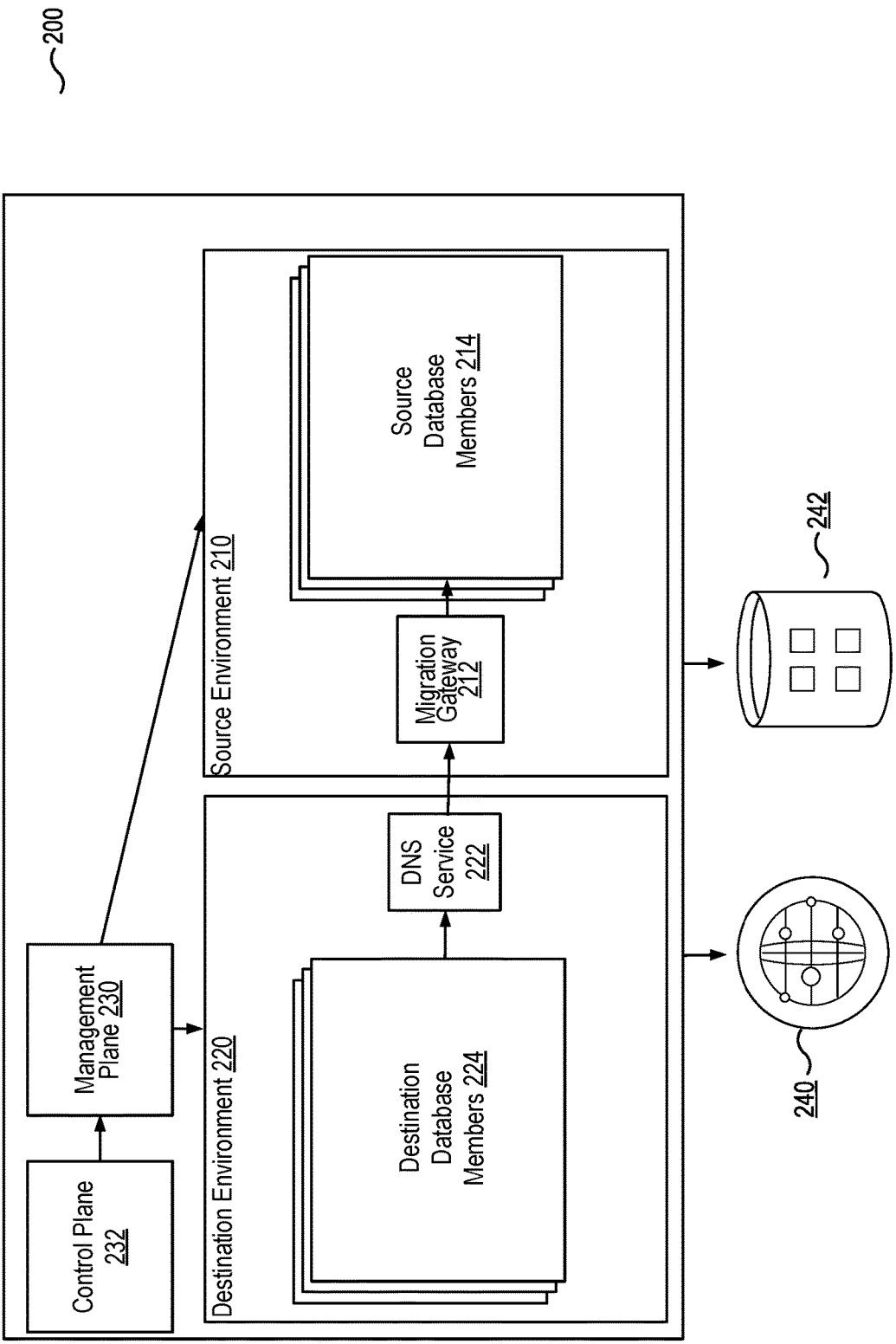
FIG. 2 is a diagram illustrating example systems involved in a zero-downtime migration, according to at least one embodiment of the present disclosure.

FIG. 2 illustrates another example diagram 200 with example systems and components for implementing the zero-downtime migration techniques described herein. The example diagram 200 illustrates an example zero-downtime migration such that database members are being migrated from the source environment 210 (for example, the source environment 110 of FIG. 1) to the destination environment 220 (for example, the destination environment 120 of FIG. 1). In this example, the original distributed database service includes database members, (for example, source database members 114, 116, 118 of FIG. 1). After the zero-downtime migration is complete, the distributed database service will contain destination database members 224 in the destination environment 220 (for example, the destination database members 124, 126, 128 of FIG. 1). The zero-downtime migration can be controlled via the management plane 230 and/or the control plane 232. Before, during, and after the zero-downtime migration, the distributed database service can communicate with and interact with the internet 240 and other systems connected to the internet 240. Similarly, before, during, and after the zero-downtime migration, the distributed database service can communicate with and interact with other systems 242 which can be owned and/or operated by the client, customer, or service provider.

In some examples, the management plane 230 can be controlled by a service provider (for example, a cloud service provider) who is providing the distributed database service to a client or customer while the control plane 232 is controlled by a client or customer using the distributed database service. The management plane 230 can be configured to manage the migration while the control plane 232 can control maintenance and other functions of the distributed database service.

In some examples, the management plane 230 can be controlled by a service provider (for example, a cloud service provider) who is providing the distributed database service to a client or customer and the control plane 232 is also controlled by the service provider. The management plane 230 can be configured to manage the migration while the control plane 232 can control maintenance and other functions of the distributed database service.

In some examples, the management plane 230 can be controlled by a client or customer and the control plane 232 is controlled by the service provider. The management plane 230 can be configured to manage the day-to-day operations of the distributed database service while the control plane 232 can control the zero-downtime migration, maintenance, and other functions of the distributed database service.

In some examples, the zero-downtime migration from the source environment 210 to the destination environment 220 can include a rearchitecture of the distributed database service. For example, the source database members 224 could be hosted in a Kubernetes cluster architecture, while the destination database members 224 can be cluster-specific compute instances which can be referred to as Kubernetes manager instances. The cluster-specific compute instances can be single tenant virtual machines that can be vended to run containerized workloads. In some examples, the cluster-specific compute instances can constitute a control plane for the distributed database service.

In some examples, the source database members 214 and/or destination database members 224 can be distributed across multiple availability domains (ADs) and fault domains (FDs). Availability domains are meant to be geographically distributed database centers such that if one availability domain goes down (meaning one database center goes down), ideally the other availability domains are still accessible and usable. Fault domains represent different physical hardware in an availability domain such that if a set of physical hardware goes down, the other sets of physical hardware do not necessarily go down. Distributing the source database members 214 and/or destination database members 224 across multiple ADs and FDs decreases the possibility that multiple database members could go down at the same time due events that affect large areas such as natural disasters, wars, and the like. In some examples, the source database members 214 can be distributed across multiple ADs and FDs and the destination database members 224 can be distributed across multiple ADs and FDs such that a source database member 214 and a destination database member 224 are within the same AD or FD.

Figure 3:
FIG. 3 illustrates a flow chart of a method for zero-downtime migration, according to at least one embodiment of the present disclosure.

FIG. 3 is a flow diagram illustrating an example process 300 for implementing the zero-downtime migration techniques described herein. Process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. The zero-downtime migration of a distributed database service can be from a source environment (for example, the source environment 110 of FIG. 1) to a destination environment (for example, the destination environment 120 of FIG. 1). In some embodiments, the management plane (for example, the management plane 230 of FIG. 2) can coordinate and/or manage the zero-downtime migration including some or all of process 300. For example, the management plane can coordinate and/or manage the distributed database service and the associated distributed database cluster. In some embodiments, the control plane (for example, the control plane 232 of FIG. 2) can coordinate and/or control the zero-downtime migration including some or all of process 300. For example, the control plane can coordinate and/or control the distributed database service and the associated distributed database cluster.

The process 300 may begin at 302, where a distributed database service can receive a request to migrate the distributed database service from a source environment to a destination environment. The distributed database service can be associated with a database and database members. The distributed database service can require consensus across a majority of database members. The database members can be a superclass for source database members and destination database members. The database members can communicate via database member hostnames. The source environment can include source database members (for example the source database members 114, 116, 118 of FIG. 1). The source environment can include at least three source database members. Each source database member can include a respective image of the database such that each source database member can process database requests. Migrating the distributed database service from the source environment to the destination environment can have zero downtime for the distributed database service.

At 304, the distributed database service can provision a migration gateway (for example, the migration gateway 112 of FIG. 1) in the source environment. At 306, the distributed database service can provision a DNS service (for example, the DNS service 122 of FIG. 1) in the destination environment. At 308, the distributed database service can provision a first destination database member (for example, destination database member 124 of FIG. 1) in the destination environment.

At 310, the distributed database service can, while updating the first destination database member with a respective image of the database, process a database request. Updating while processing a database request enables the zero-downtime migration techniques described herein. Updating the first destination database member can include, at 312, sending a database image request to the DNS service. The database image request includes a hostname of a first source database member. Updating the first destination database member can include, at 314, sending the database image request to the migration gateway based at least in part on the hostname of the first source database member. Updating the first destination database member can include, at 316, receiving a respective image of the database. The process 300 can also include processing, after updating the first destination database member, a second database request, wherein the first destination database member processes the second database request.

The process 300 can also include provisioning, by the distributed database service, additional source database members in the source environment for the distributed database service as described herein. The additional source database members includes at least one or two additional source database members. The process 300 can also include updating the additional source database members with respective images of the database as described herein. The process 300 can also include removing a source database member as described herein. The process 300 can also include provisioning, by the distributed database service, a second destination database member in the destination environment as described herein. The process 300 can also include updating the second destination database member with a respective image of the database as described herein.

As noted above, infrastructure as a service (IaaS) (for example, any of the following: the source environment 110 and the destination environment 120 of FIG. 1, and the management plane 230 and the control plane 232 of FIG. 2) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first be desired to be set up. In some instances, the provisioning can be done manually, a provisioning tool may be utilized to provision the resources, and/or deployment tools may be utilized to deploy the code once the infrastructure is provisioned.

Figure 4:
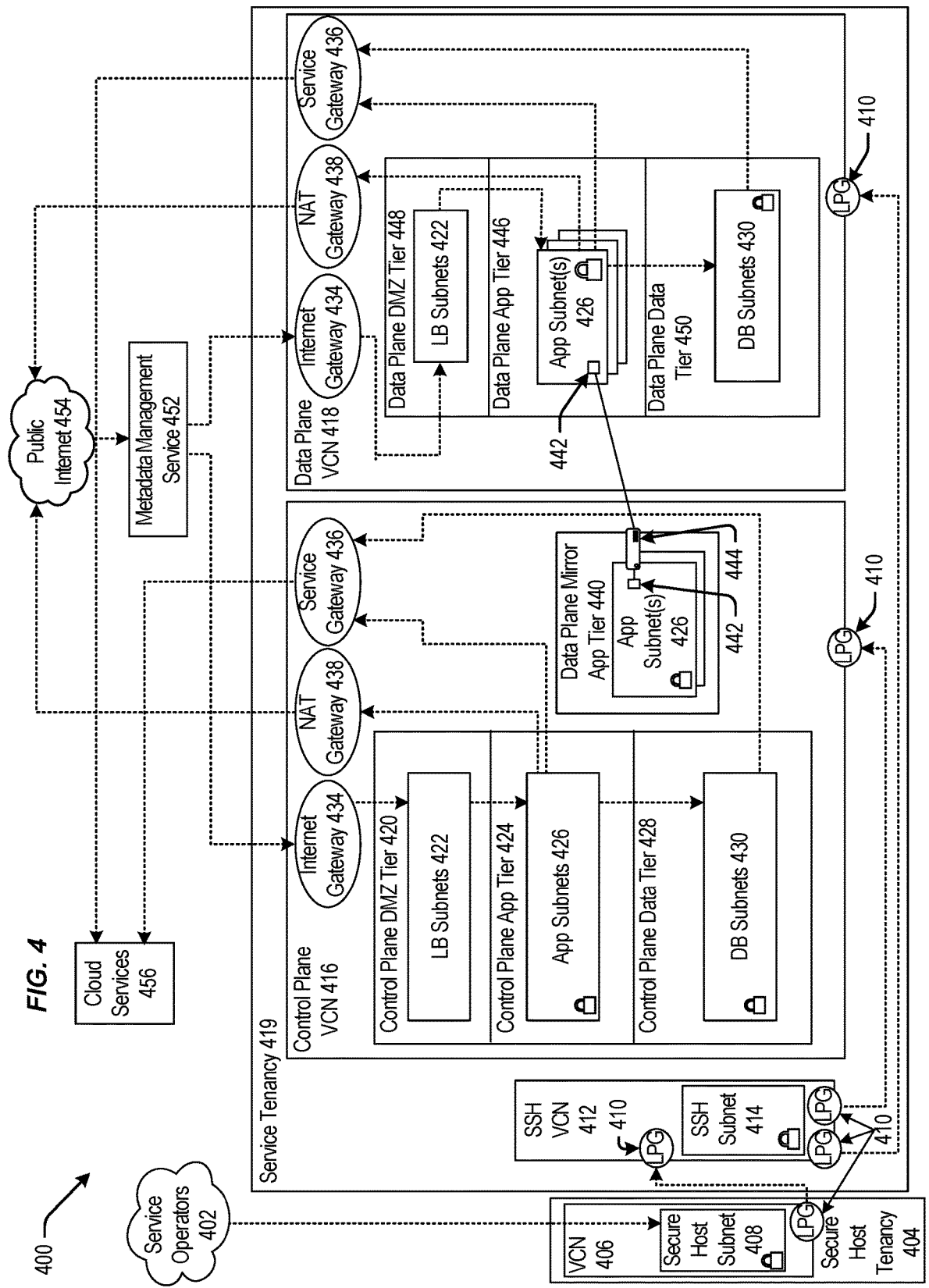
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Metadata that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
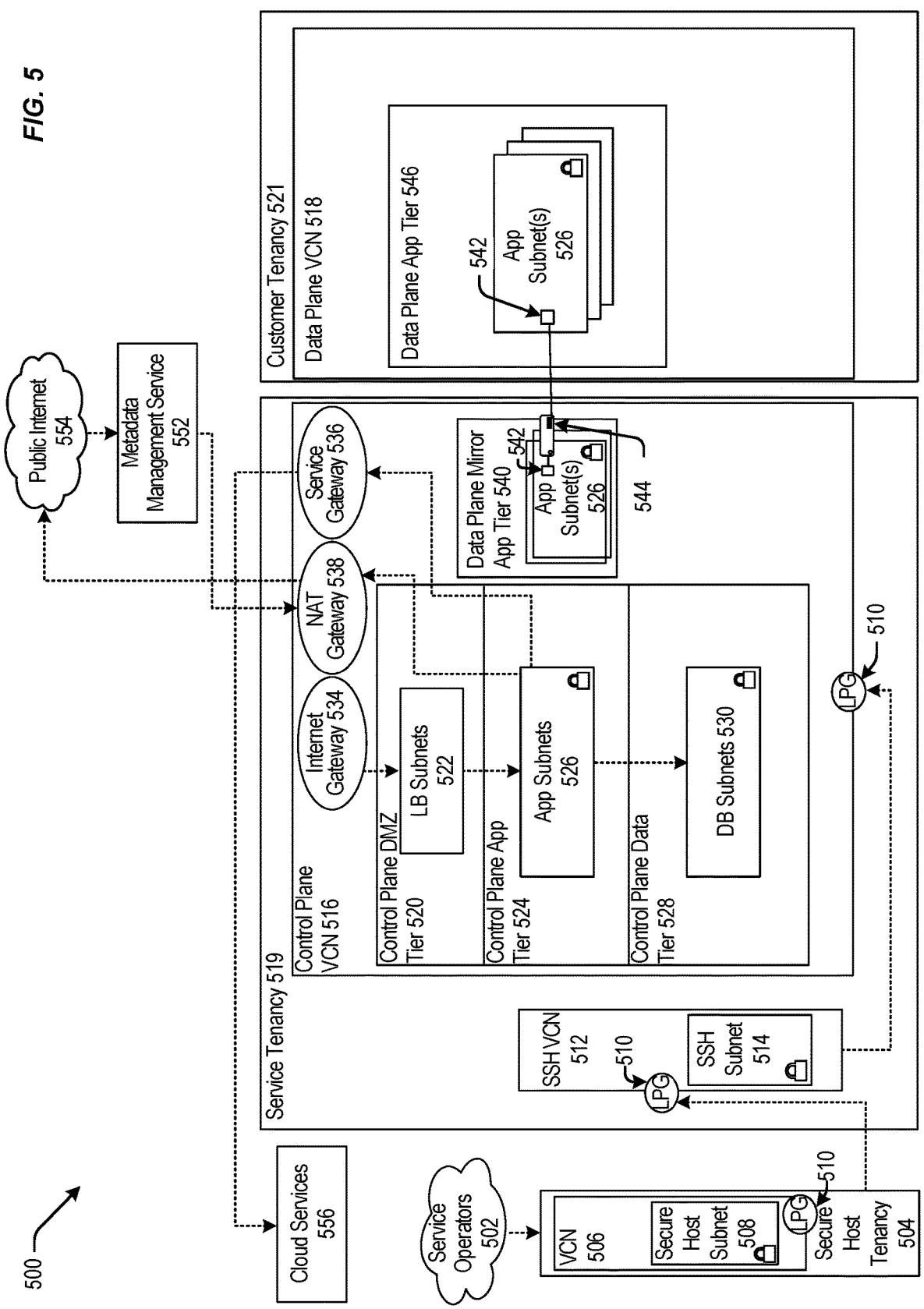
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g., service operators 402 of FIG. 4) can be communicatively coupled to a secure host tenancy 504 (e.g., the secure host tenancy 404 of FIG. 4) that can include a virtual cloud network (VCN) 506 (e.g., the VCN 406 of FIG. 4) and a secure host subnet 508 (e.g., the secure host subnet 408 of FIG. 4). The VCN 506 can include a local peering gateway (LPG) 510 (e.g., the LPG 410 of FIG. 4) that can be communicatively coupled to a secure shell (SSH) VCN 512 (e.g., the SSH VCN 412 of FIG. 4) via an LPG 410 contained in the SSH VCN 512. The SSH VCN 512 can include an SSH subnet 514 (e.g., the SSH subnet 414 of FIG. 4), and the SSH VCN 512 can be communicatively coupled to a control plane VCN 516 (e.g., the control plane VCN 416 of FIG. 4) via an LPG 510 contained in the control plane VCN 516. The control plane VCN 516 can be contained in a service tenancy 519 (e.g., the service tenancy 419 of FIG. 4), and the data plane VCN 518 (e.g., the data plane VCN 418 of FIG. 4) can be contained in a customer tenancy 521 that may be owned or operated by users, or customers, of the system.

The control plane VCN 516 can include a control plane DMZ tier 520 (e.g., the control plane DMZ tier 420 of FIG. 4) that can include LB subnet(s) 522 (e.g., LB subnet(s) 422 of FIG. 4), a control plane app tier 524 (e.g., the control plane app tier 424 of FIG. 4) that can include app subnet(s) 526 (e.g., app subnet(s) 426 of FIG. 4), a control plane data tier 528 (e.g., the control plane data tier 428 of FIG. 4) that can include database (DB) subnet(s) 530 (e.g., similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g., the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g., the service gateway 436 of FIG. 4) and a network address translation (NAT) gateway 538 (e.g., the NAT gateway 438 of FIG. 4). The control plane VCN 516 can include the service gateway 536 and the NAT gateway 538.

The control plane VCN 516 can include a data plane mirror app tier 540 (e.g., the data plane mirror app tier 440 of FIG. 4) that can include app subnet(s) 526. The app subnet(s) 526 contained in the data plane mirror app tier 540 can include a virtual network interface controller (VNIC) 542 (e.g., the VNIC of 442) that can execute a compute instance 544 (e.g., similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g., the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g., the metadata management service 452 of FIG. 4) that can be communicatively coupled to public Internet 554 (e.g., public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g., cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
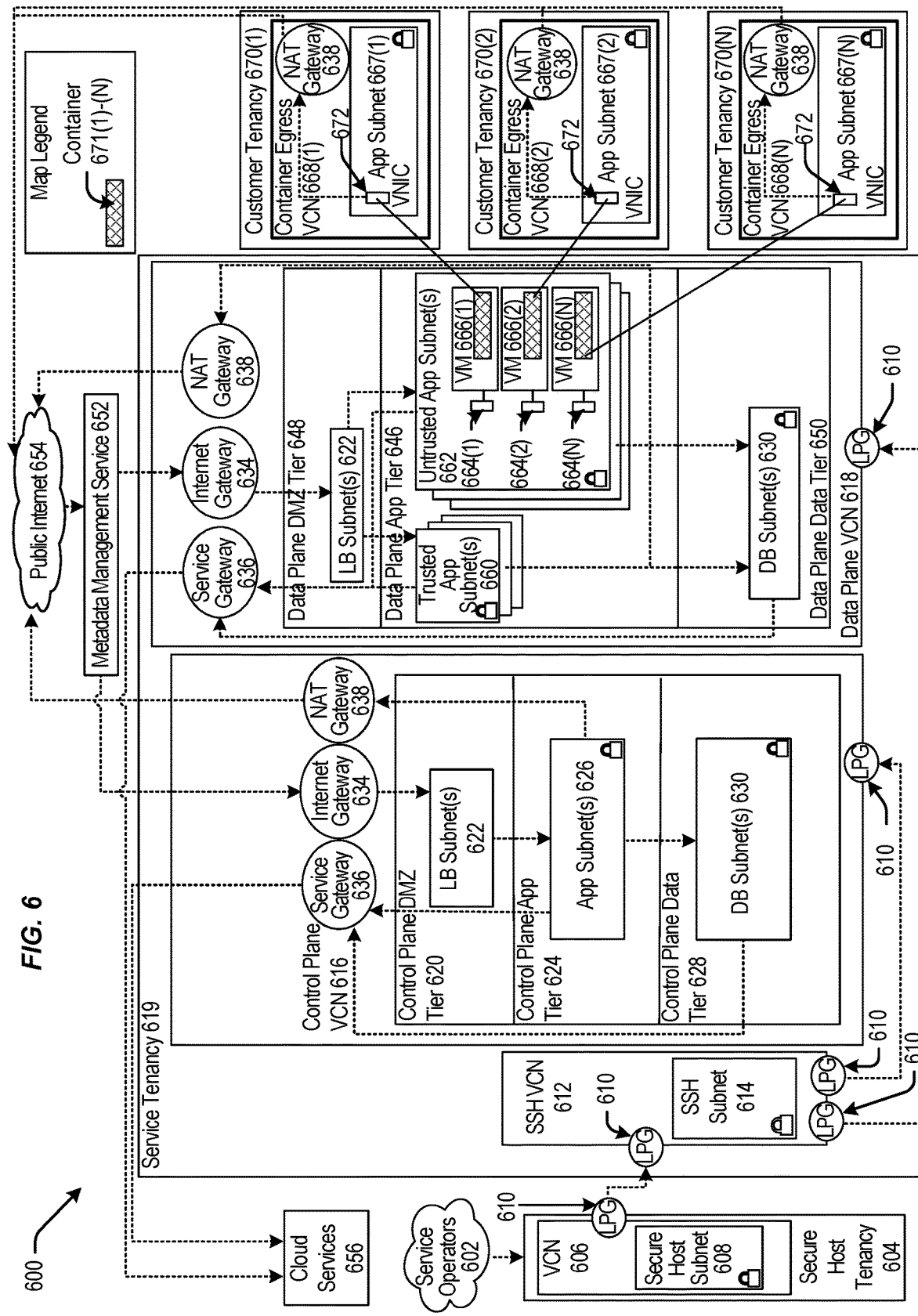
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 402 of FIG. 4) can be communicatively coupled to a secure host tenancy 604 (e.g., the secure host tenancy 404 of FIG. 4) that can include a virtual cloud network (VCN) 606 (e.g., the VCN 406 of FIG. 4) and a secure host subnet 608 (e.g., the secure host subnet 408 of FIG. 4). The VCN 606 can include an LPG 610 (e.g., the LPG 410 of FIG. 4) that can be communicatively coupled to an SSH VCN 612 (e.g., the SSH VCN 412 of FIG. 4) via an LPG 610 contained in the SSH VCN 612. The SSH VCN 612 can include an SSH subnet 614 (e.g., the SSH subnet 414 of FIG. 4), and the SSH VCN 612 can be communicatively coupled to a control plane VCN 616 (e.g., the control plane VCN 416 of FIG. 4) via an LPG 610 contained in the control plane VCN 616 and to a data plane VCN 618 (e.g., the data plane 418 of FIG. 4) via an LPG 610 contained in the data plane VCN 618. The control plane VCN 616 and the data plane VCN 618 can be contained in a service tenancy 619 (e.g., the service tenancy 419 of FIG. 4).

The control plane VCN 616 can include a control plane DMZ tier 620 (e.g., the control plane DMZ tier 420 of FIG. 4) that can include load balancer (LB) subnet(s) 622 (e.g., LB subnet(s) 422 of FIG. 4), a control plane app tier 624 (e.g., the control plane app tier 424 of FIG. 4) that can include app subnet(s) 626 (e.g., similar to app subnet(s) 426 of FIG. 4), a control plane data tier 628 (e.g., the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g., the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g., the service gateway of FIG. 4) and a network address translation (NAT) gateway 638 (e.g., the NAT gateway 438 of FIG. 4). The control plane VCN 616 can include the service gateway 636 and the NAT gateway 638.

The data plane VCN 618 can include a data plane app tier 646 (e.g., the data plane app tier 446 of FIG. 4), a data plane DMZ tier 648 (e.g., the data plane DMZ tier 448 of FIG. 4), and a data plane data tier 650 (e.g., the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g., public Internet 454 of FIG. 4).

The Internet gateway 634 contained in the control plane VCN 616 and contained in the data plane VCN 618 can be communicatively coupled to a metadata management service 652 (e.g., the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
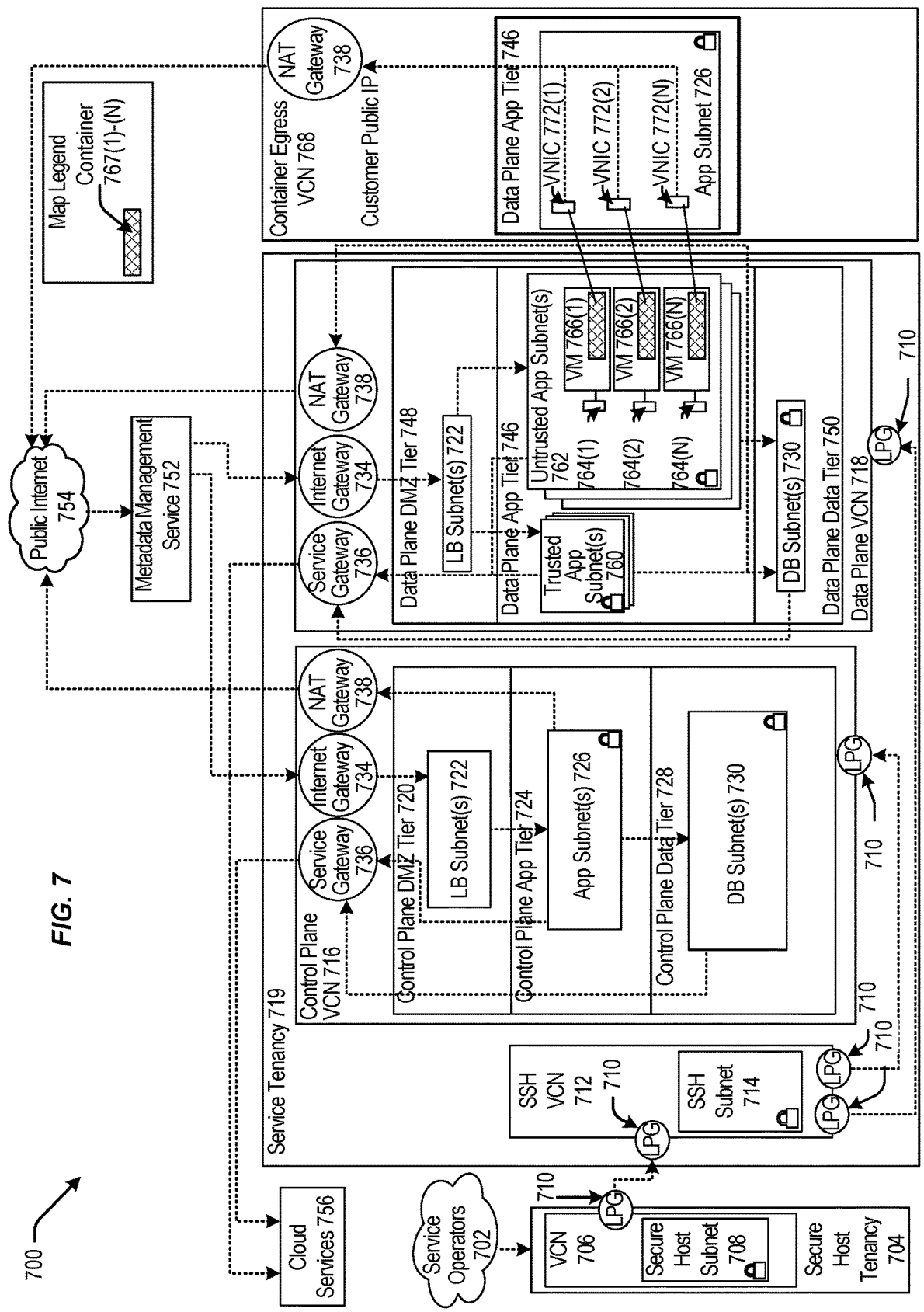
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 402 of FIG. 4) can be communicatively coupled to a secure host tenancy 704 (e.g., the secure host tenancy 404 of FIG. 4) that can include a virtual cloud network (VCN) 706 (e.g., the VCN 406 of FIG. 4) and a secure host subnet 708 (e.g., the secure host subnet 408 of FIG. 4). The VCN 706 can include an LPG 710 (e.g., the LPG 410 of FIG. 4) that can be communicatively coupled to an SSH VCN 712 (e.g., the SSH VCN 412 of FIG. 4) via an LPG 710 contained in the SSH VCN 712. The SSH VCN 712 can include an SSH subnet 714 (e.g., the SSH subnet 414 of FIG. 4), and the SSH VCN 712 can be communicatively coupled to a control plane VCN 716 (e.g., the control plane VCN 416 of FIG. 4) via an LPG 710 contained in the control plane VCN 716 and to a data plane VCN 718 (e.g., the data plane 418 of FIG. 4) via an LPG 710 contained in the data plane VCN 718. The control plane VCN 716 and the data plane VCN 718 can be contained in a service tenancy 719 (e.g., the service tenancy 419 of FIG. 4).

The control plane VCN 716 can include a control plane DMZ tier 720 (e.g., the control plane DMZ tier 420 of FIG. 4) that can include LB subnet(s) 722 (e.g., LB subnet(s) 422 of FIG. 4), a control plane app tier 724 (e.g., the control plane app tier 424 of FIG. 4) that can include app subnet(s) 726 (e.g., app subnet(s) 426 of FIG. 4), a control plane data tier 728 (e.g., the control plane data tier 428 of FIG. 4) that can include DB subnet(s) 730 (e.g., DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g., the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 4) and a network address translation (NAT) gateway 738 (e.g., the NAT gateway 438 of FIG. 4). The control plane VCN 716 can include the service gateway 736 and the NAT gateway 738.

The data plane VCN 718 can include a data plane app tier 746 (e.g., the data plane app tier 446 of FIG. 4), a data plane DMZ tier 748 (e.g., the data plane DMZ tier 448 of FIG. 4), and a data plane data tier 750 (e.g., the data plane data tier 450 of FIG. 4). The data plane DMZ tier 748 can include LB subnet(s) 722 that can be communicatively coupled to trusted app subnet(s) 760 (e.g., trusted app subnet(s) 660 of FIG. 6) and untrusted app subnet(s) 762 (e.g., untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g., public Internet 454 of FIG. 4).

The Internet gateway 734 contained in the control plane VCN 716 and contained in the data plane VCN 718 can be communicatively coupled to a metadata management service 752 (e.g., the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
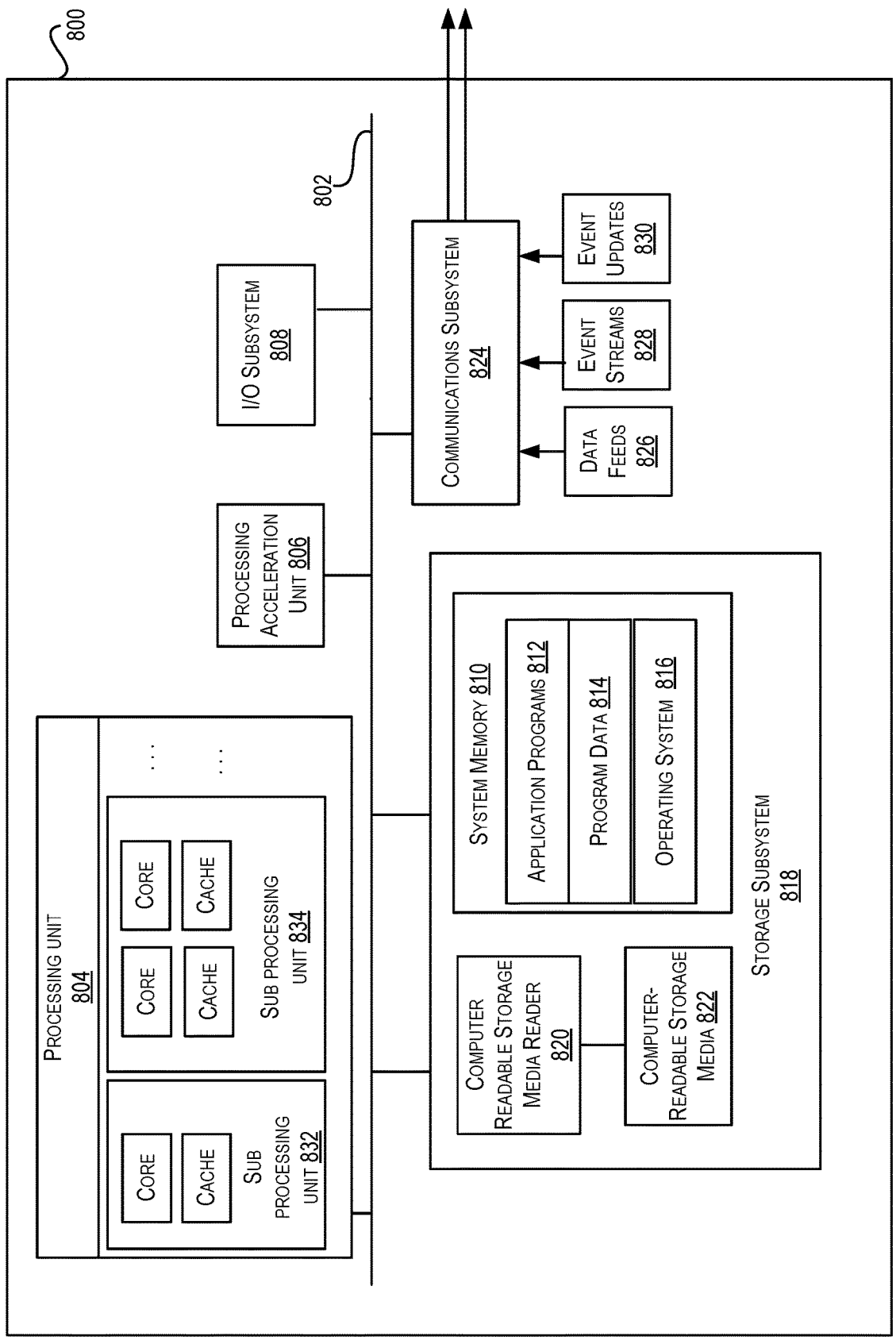
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 804 provide the functionality described above. Storage subsystem 818 may also provide a repository for storing data used in accordance with the present disclosure.

As depicted in the example in FIG. 8, storage subsystem 818 can include various components including a system memory 810, computer-readable storage media 822, and a computer readable storage media reader 820. System memory 810 may store program instructions that are loadable and executable by processing unit 804. System memory 810 may also store data that is used during the execution of the instructions and/or data that is generated during the execution of the program instructions. Various different kinds of programs may be loaded into system memory 810 including but not limited to client applications, Web browsers, mid-tier applications, relational database management systems (RDBMS), virtual machines, containers, etc.

System memory 810 may also store an operating system 816. Examples of operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 800 executes one or more virtual machines, the virtual machines along with their guest operating systems (GOSs) may be loaded into system memory 810 and executed by one or more processors or cores of processing unit 804.

System memory 810 can come in different configurations depending upon the type of computer system 800. For example, system memory 810 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 810 may include a basic input/output system (BIOS) containing basic routines that help to transfer information between elements within computer system 800, such as during start-up.

Computer-readable storage media 822 may represent remote, local, fixed, and/or removable storage devices plus storage media for temporarily and/or more permanently containing, storing, computer-readable information for use by computer system 800 including instructions executable by processing unit 804 of computer system 800.

Computer-readable storage media 822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Machine-readable instructions executable by one or more processors or cores of processing unit 804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a distributed database service, a request to migrate the distributed database service from a source environment to a destination environment, wherein the distributed database service is associated with a database and database members, wherein the source environment including source database members, and wherein each source database member includes a respective image of the database;
   provisioning, by the distributed database service, a migration gateway in the source environment;
   provisioning, by the distributed database service, a domain name system (DNS) service in the destination environment;
   provisioning, by the distributed database service, a first destination database member in the destination environment; and
   while updating the first destination database member with a respective image of the database, processing, by the distributed database service, a database request, wherein updating the first destination database member includes:
   sending a database image request to the DNS service, wherein the database image request includes a hostname of a first source database member;
   sending the database image request to the migration gateway based at least in part on the hostname of the first source database member; and
   receiving a respective image of the database.

2. The method of claim 1, wherein migrating the distributed database service from the source environment to the destination environment has zero downtime for the distributed database service.

3. The method of claim 1, wherein the distributed database service requires consensus across a majority of database members.

4. The method of claim 1, further comprising:
   provisioning, by the distributed database service, additional source database members in the source environment for the distributed database service; and
   updating the additional source database members with respective images of the database.

5. The method of claim 4, wherein the source environment includes at least three source database members.

6. The method of claim 5, wherein the additional source database members includes at least two additional source database members.

7. The method of claim 4, further comprising removing a source database member.

8. The method of claim 7, further comprising
   provisioning, by the distributed database service, a second destination database member in the destination environment; and
   updating the second destination database member with a respective image of the database.

9. The method of claim 1, further comprising processing, after updating the first destination database member, a second database request, wherein the first destination database member processes the second database request.

10. The method of claim 1, wherein database members communicate via database member hostnames.

11. A system comprising:
    a distributed database service associated with a database and database members;
    a source environment including source database members, wherein each source database member includes a respective image of the database; and
    a destination environment;
    wherein the distributed database service is configured to:
    receive a request to migrate the distributed database service from a source environment to a destination environment, wherein the distributed database service is associated with a database and database members, wherein the source environment including source database members, and wherein each source database member includes a respective image of the database;
    provision a migration gateway in the source environment;
    provision a domain name system (DNS) service in the destination environment;
    provision a first destination database member in the destination environment; and
    while updating the first destination database member with a respective image of the database, process a database request, wherein updating the first destination database member includes:
    send a database image request to the DNS service, wherein the database image request includes a hostname of a first source database member;
    send the database image request to the migration gateway based at least in part on the hostname of the first source database member; and
    receive a respective image of the database.

12. The system of claim 11, wherein the distributed database service is further configured to:
    provision additional source database members in the source environment for the distributed database service; and
    update the additional source database members with respective images of the database.

13. The system of claim 12, wherein the distributed database service is further configured to remove a source database member.

14. The system of claim 13, wherein the distributed database service is further configured to:
provision a second destination database member in the destination environment; and
update the second destination database member with a respective image of the database.

15. The system of claim 11, wherein database members communicate via database member hostnames.

16. One or more non-transitory computer-readable medium comprising computer-executable instructions that, when executed by one or more processors, cause the one or more processors to perform operations comprising:
receiving a request to migrate a distributed database service from a source environment to a destination environment, wherein the distributed database service is associated with a database and database members, wherein the source environment including source database members, wherein each source database member includes a respective image of the database;
provisioning a migration gateway in the source environment;
provisioning a domain name system (DNS) service in the destination environment;
provisioning a first destination database member in the destination environment; and
while updating the first destination database member with a respective image of the database, processing a database request, wherein updating the first destination database member includes:
sending a database image request to the DNS service, wherein the database image request includes a hostname of a first source database member;
sending the database image request to the migration gateway based at least in part on the hostname of the first source database member; and
receiving a respective image of the database.

17. The one or more non-transitory computer-readable medium of claim 16, wherein the operations further comprise:
provisioning additional source database members in the source environment for the distributed database service; and
updating the additional source database members with respective images of the database.

18. The one or more non-transitory computer-readable medium of claim 17, wherein the operations further comprise removing a source database member.

19. The one or more non-transitory computer-readable medium of claim 18, wherein the operations further comprise:
provisioning a second destination database member in the destination environment; and
updating the second destination database member with a respective image of the database.

20. The one or more non-transitory computer-readable medium of claim 16, wherein database members communicate via database member hostnames.

* * * * *

UNITED STATES PATENT AND TRADEMARK OFFICE
CERTIFICATE OF CORRECTION

| | |
|---|---|
| PATENT NO. | : 12,045,210 B1 |
| APPLICATION NO. | : 18/320677 |
| DATED | : July 23, 2024 |
| INVENTOR(S) | : Horwitz et al. |

It is certified that error appears in the above-identified patent and that said Letters Patent is hereby corrected as shown below:

On the Title Page

Column 2, under item (57) Abstract, Line 4, delete "the" and insert -- The --, therefor.

In the Specification

In Column 4, Line 16, delete "and or" and insert -- and/or --, therefor.

In the Claims

In Column 29, Line 18, in Claim 16, after "members," insert -- and --, therefor.

Signed and Sealed this
Tenth Day of December, 2024

Katherine Kelly Vidal
*Director of the United States Patent and Trademark Office*